United States Patent
Rakotomalala et al.

(10) Patent No.: US 11,053,375 B2
(45) Date of Patent: Jul. 6, 2021

(54) ANTICORROSIVE FLAME RETARDANT FORMULATIONS FOR THERMOPLASTIC POLYMERS

(71) Applicant: CLARIANT PLASTICS & COATINGS LTD, Muttenz (CH)

(72) Inventors: Muriel Rakotomalala, Sankt Leon Roth (DE); Elke Schlosser, Augsburg (DE); Sebastian Hoerold, Diedorf (DE); Wolfgang Wanzke, Augsburg (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 15/738,497

(22) PCT Filed: Jun. 20, 2016

(86) PCT No.: PCT/EP2016/064116
§ 371 (c)(1),
(2) Date: Dec. 20, 2017

(87) PCT Pub. No.: WO2016/207087
PCT Pub. Date: Dec. 29, 2016

(65) Prior Publication Data
US 2018/0171112 A1    Jun. 21, 2018

(30) Foreign Application Priority Data

Jun. 24, 2015 (DE) .............. 102015211728

(51) Int. Cl.
*C08K 13/02* (2006.01)
*C08K 3/016* (2018.01)
(Continued)

(52) U.S. Cl.
CPC .............. *C08K 13/02* (2013.01); *C08K 3/016* (2018.01); *C08K 3/24* (2013.01); *C08K 5/0066* (2013.01);
(Continued)

(58) Field of Classification Search
None
See application file for complete search history.

(56) References Cited

U.S. PATENT DOCUMENTS 3,900,444 A    8/1975   Racky et al.
4,036,811 A    7/1977   Noetzel et al.
(Continued)

FOREIGN PATENT DOCUMENTS

DE    2252258 A1    5/1974
DE    2447727 A1    4/1976
(Continued)

OTHER PUBLICATIONS

International Search Report issued in corresponding International Patent Application No. PCT/EP2016/064116 dated Aug. 25, 2016.
(Continued)

*Primary Examiner* — Robert T Butcher
(74) *Attorney, Agent, or Firm* — Morgan, Lewis & Bockius LLP

(57) ABSTRACT

The invention provides anticorrosive flame retardant formulations for thermoplastic polymers, comprising from 20 to 97.9% by weight of a (di)phosphinic acid salt of formula (I) and/or (II)

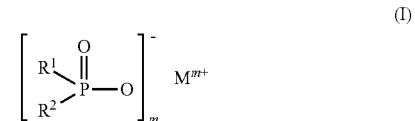

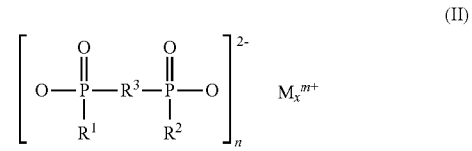

wherein
$R^1$, $R^2$ are the same or different and denote H or $C_1$-$C_6$-alkyl, linear or branched, and/oFr aryl;
$R^3$ denotes $C_1$-$C_{10}$-alkylene, linear or branched, $C_6$-$C_{10}$-arylene, $C_6$-$C_{10}$-alkylarylene or $C_7$-$C_{20}$-arylalkylene;
M denotes Mg, Ca, Al, Sb, Sn, Ge, Ti, Fe, Zr, Ce, Bi, Sr, Mn, Li, Na, K and/or a protonated nitrogen base;
m denotes from 1 to 4; n denotes from 1 to 4; x denotes from 1 to 4,
and as component B from 2 to 50% by weight of a phosphazene of the general formula (III) or (IV)

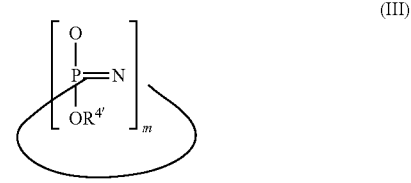

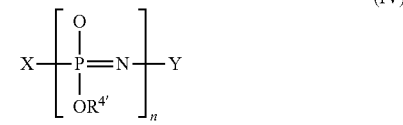

wherein
$R^4$ and $R^{4'}$ are the same or different and represent $C_1$-$C_{20}$-alkyl, $C_6$-$C_{30}$-aryl, $C_6$-$C_{30}$-arylalkyl or $C_6$-$C_{30}$-alkyl substituted aryl, and
X represents a group —N=P(OPh)$_3$ or —N=P(O)OPh and Y represents the group —P(OPh)$_4$ or —P(O)(OPh)$_2$;
as component C from 0.1 to 30% by weight of an inorganic tin compound, and
(Continued)

as component D from 0 to 50% by weight of a nitrogen-containing flame retardant.

8 Claims, No Drawings

(51) Int. Cl.
  *C08K 5/5313* (2006.01)
  *C08K 5/00* (2006.01)
  *C08K 5/3492* (2006.01)
  *C08K 5/5399* (2006.01)
  *C09K 21/12* (2006.01)
  *C08K 3/24* (2006.01)

(52) U.S. Cl.
  CPC ........ *C08K 5/34922* (2013.01); *C08K 5/5313* (2013.01); *C08K 5/5399* (2013.01); *C09K 21/12* (2013.01)

(56) References Cited

U.S. PATENT DOCUMENTS

| | | | |
|---|---|---|---|
| 5,780,534 | A | 7/1998 | Kleiner et al. |
| 6,207,736 | B1 | 3/2001 | Nass et al. |
| 6,255,371 | B1 | 7/2001 | Schlosser et al. |
| 6,509,401 | B1 | 1/2003 | Jenewein et al. |
| 2009/0234051 | A1 | 9/2009 | Endtner et al. |
| 2009/0239986 | A1* | 9/2009 | Kim ................ C08L 67/02 524/405 |
| 2010/0261818 | A1 | 10/2010 | Seki |
| 2012/0149816 | A1 | 6/2012 | Lee et al. |
| 2013/0190432 | A1* | 7/2013 | Krause ................ C08K 5/0008 524/101 |
| 2013/0210968 | A1* | 8/2013 | Hoerold ................ C08K 5/53 524/89 |

FOREIGN PATENT DOCUMENTS

| | | |
|---|---|---|
| DE | 19734437 A1 | 2/1999 |
| DE | 19737727 A1 | 7/1999 |
| DE | 102005050956 A1 | 4/2007 |
| DE | 102010048025 A1 | 4/2012 |
| DE | 102010049968 A1 | 5/2012 |
| EP | 0699708 A2 | 3/1996 |
| JP | 2010-202748 A | 9/2010 |
| JP | 52-76000 B2 | 8/2013 |
| JP | 2014-513191 A | 5/2014 |
| WO | 9739053 A1 | 10/1997 |
| WO | 2005059018 A1 | 6/2005 |
| WO | 2009109318 A1 | 9/2009 |
| WO | 2010/002403 A1 | 1/2010 |
| WO | 2012/152805 A1 | 11/2012 |

OTHER PUBLICATIONS

Written Opinion issued in corresponding International Patent Application No. PCT/EP2016/064116 dated Aug. 25, 2016.

Office Action dated Apr. 7, 2021, issued in corresponding Japanese Patent Application 2017-559395.

* cited by examiner

ANTICORROSIVE FLAME RETARDANT FORMULATIONS FOR THERMOPLASTIC POLYMERS

The invention relates to flame retardant formulations which can be used in polymers in order to produce flame-retarded compounds having excellent mechanical and electrical properties, and which do not exhibit any measurable wear when they are incorporated.

Because of their chemical composition, many plastics materials are highly combustible. In order to be able to achieve the high requirements that are made in terms of fire retardancy by plastics processors and in some case by the legislator, plastics materials must therefore generally be provided with flame retardants. A large number of different flame retardants and flame retardant synergists are known for this purpose and are also available commercially.

Non-halogenated flame retardant systems have preferably been used for some time because of their more advantageous fire side-effects in relation to smoke density and smoke composition, as well as for ecological reasons. Among the non-halogenated flame retardants, the salts of phosphinic acids (phosphinates) in particular have been found to be particularly effective for thermoplastic polyesters (DE-A-2 252 258 and DE-A-2 447 727). Calcium and aluminum phosphinates have been described as very effective in polyesters and impair the material properties of the polymer molding compositions less than, for example, the alkali metal salts (EP-A-0 699 708).

There have additionally been found synergistic combinations of phosphinates with various nitrogen-containing compounds which are more effective as flame retardants than the phosphinates on their own in a large number of polymers (PCT/EP97/01664, DE-A-197 34 437, DE-A-197 37 727 and U.S. Pat. No. 6,255,371).

WO-A-2005/059 018 describes a polybutylene terephthalate with a nitrogen-containing flame retardant, a phosphinate and an ash-forming polymer. Ash-forming polymers here are polyetherimides, polyphenylene ethers, polyphenylene sulfide, polysulfones, polyether sulfones, polyphenylene sulfide oxides or phenolic resins. The flame resistance is improved by adding the ash-forming polymer. Disadvantages are the high price of the ash-forming polymers and their tendency to discoloration.

DE-A-10 2005 050956 describes thermoplastic molding compositions of a polybutylene terephthalate, a polyester other than polybutylene terephthalate, as well as phosphinates and a reaction product of a nitrogen-containing compound with phosphoric acid. Polyethylene terephthalate (PET) and polytrimethylene terephthalate are preferred. UL 94 V-0 (Underwriters Laboratories Inc. Standard of Safety, "Test for Flammability of Plastic Materials for Parts in Devices and Appliances", pages 14 to 18, Northbrook 1998) as well as a good tracking index and good mechanical properties are achieved only by adding PET. A GWIT (glow wire ignition temperature) according to IEC 60695-2-13 of 775° C. at a material thickness of 1.5 mm is achieved.

If phosphinates are used in polyesters on their own or in combination with other flame retardants, there is generally a certain polymer degradation, which has a negative effect on the mechanical properties of the polymer system. It is also not possible to obtain flame-resistant polyesters having good mechanical properties by using phosphazenes on their own or in combination with other flame retardants. Further disadvantages are uncertain UL 94 V-0 classifications owing to excessively long afterburning times of individual test specimens, an uncertain GWIT 775° C. classification at thin wall thicknesses (<1.5 mm) and elongations at break of below 2%, in particular with glass (fiber) contents of 25-35%.

DE-A-10 2010 049968 describes flame-resistant polyesters with phosphinate, a phosphazene and a condensation product of a nitrogen-containing compound with phosphoric acid as flame retardant. UL 94 V-0 and an elongation at tear of over 2% can be achieved simultaneously only by adding phosphazene. A GWIT (glow wire ignition temperature) according to IEC 60695-2-13 of 775° C. at a material thickness of 1 mm is achieved.

A disadvantage of the described additions of flame retardants is greater wear of metal parts of the plasticizing unit and the die during compounding. Similar problems can occur in the injection molding of polyester or high-temperature polyamide compounds with specific phosphinates.

WO-A-2009/109318 describes the production of flame-resistant, non-corrosive and readily flowable polyamide and polyester molding compositions. The flame retardant mixture used therein consists of a phosphinic acid salt and a metal salt. By means of a special combination of aluminum diethylphosphinate and zinc stannate, a PA6T/66 molding composition achieves UL94 V-0 (PA=polyamide) while at the same time exhibiting low corrosion.

DE-A-10 2010 048025 describes a flame retardant/stabilizer combination for thermoplastic plastics. The above-mentioned combination consists of a salt of a dialkylphosphinic acid, a salt of a phosphorous acid, a nitrogen-containing synergist and a zinc salt as stabilizer. Polyesters with this combination achieve UL94 V-0 with higher elongation at tear, wherein a small addition of phosphorous acid to PA6T/66 leads to low corrosion. References to positive effects of such a combination in polyester on wear are not to be found.

Accordingly, the object of the present invention was to find flame retardant formulations for polymers which exhibit a very good flame retardant activity even at thin material thicknesses (applications), with which good mechanical properties of compounds are achieved, and which do not exhibit detectable increased corrosion during processing.

It has how been found, surprisingly, that mixtures of metal phosphinates, phosphazene, a nitrogen-containing synergist and a zinc-containing compound are effective flame retardants, in the processing of which no corrosion is detectable and which yield compounds having good mechanical properties.

It has further been found, surprisingly, that electrical parameters such as the tracking index of the compounds are significantly improved, and that no corrosion is detectable in application tests.

Accordingly, the invention provides a flame retardant formulation for thermoplastic polymers, comprising as component A from 20 to 97.9% by weight of a phosphinic acid salt of formula (I) and/or of a diphosphinic acid salt of formula (II) and/or polymers thereof

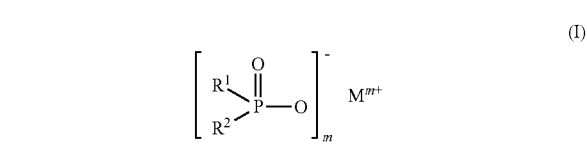

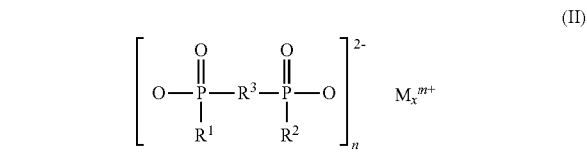

wherein
R$^1$, R$^2$ are the same or different and denote H or C$_1$-C$_6$-alkyl, linear or branched, and/or aryl;
R$^3$ denotes C$_1$-C$_{10}$-alkylene, linear or branched, C$_6$-C$_{10}$-arylene, C$_6$-C$_{10}$-alkylarylene or C$_7$-C$_{20}$-arylalkylene;
M denotes Mg, Ca, Al, Sb, Sn, Ge, Ti, Fe, Zr, Ce, Bi, Sr, Mn, Li, Na, K and/or a protonated nitrogen base;
m denotes from 1 to 4; n denotes from 1 to 4; x denotes from 1 to 4,
and as component B from 2 to 50% by weight of a phosphazene of the general formula (III) or (IV)

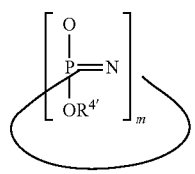

(III)

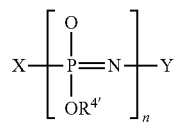

(IV)

wherein
R$^4$ and R$^{4'}$ are the same or different and represent C$_1$-C$_{20}$-alkyl, C$_6$-C$_{30}$-aryl, C$_6$-C$_{30}$-arylalkyl or C$_6$-C$_{30}$-alkyl substituted aryl, and
X represents a group —N=P(OPh)$_3$ or —N=P(O)OPh and Y represents the group —P(OPh)$_4$ or —P(O)(OPh)$_2$;
as component C from 0.1 to 30% by weight of an inorganic zinc compound, and
as component D from 0 to 50% by weight of a nitrogen-containing flame retardant.

R$^1$ and R$^2$ are preferably the same or different and denote methyl, ethyl, n-propyl, isopropyl, n-butyl, tert-butyl, n-pentyl and/or phenyl.

R$^3$ preferably denotes methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

Preferably, the flame retardant formulation comprises
from 30 to 97.5% by weight component A,
from 2 to 40% by weight component B,
from 0.5 to 30% by weight component C and
from 0 to 40% by weight component D,
wherein the sum of the components by weight is 100% by weight.

Particularly preferably, the flame retardant formulation comprises
from 40 to 94% by weight component A,
from 5 to 40% by weight component B,
from 1 to 20% by weight component C and
from 0 to 35% by weight component D,
wherein the sum of the components by weight is 100% by weight.

In particular, the flame retardant formulation comprises
from 50 to 82% by weight component A,
from 10 to 30% by weight component B,
from 2 to 19% by weight component C and
from 1 to 30% by weight component D, wherein the sum of the components by weight is 100% by weight.

Most particularly preferably, the flame retardant formulation comprises
from 60 to 86% by weight component A,
from 10 to 20% by weight component B,
from 2 to 18% by weight component C and
from 2 to 20% by weight component D,
wherein the sum of the components by weight is 100% by weight.

The phosphazenes are preferably phenoxyphosphazenes.
Component D is Preferably
a) melamine phosphate, dimelamine phosphate, melamine pyrophosphate, melamine polyphosphates, melam polyphosphates, melem polyphosphates and/or melon polyphosphates and/or melamine condensation products, such as melam, melem and/or melon;
and/or b) nitrogen compounds of formulae (VII) to (XII) or mixtures thereof

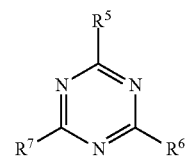

(VII)

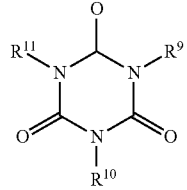

(VIII)

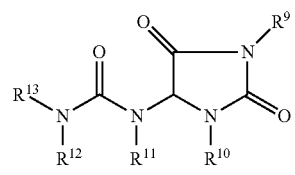

(IX)

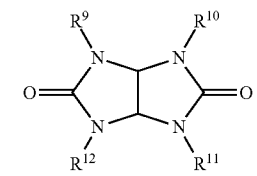

(X)

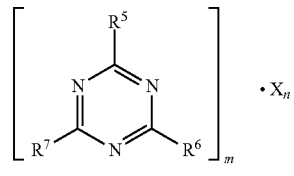

(XI)

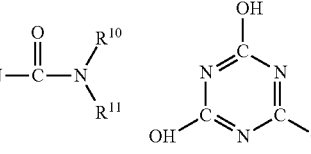

(XII)

wherein
R$^5$ to R$^7$ denote hydrogen, C$_1$-C$_8$-alkyl, C$_5$-C$_{16}$-cycloalkyl or -alkylcycloalkyl, optionally substituted by a hydroxy or $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, as well as N-alicyclic or N-aromatic, $R^8$ denotes hydrogen, $C_1$-$C_8$-alkyl, $C_5$-$C_{16}$-cycloalkyl or -alkylcycloalkyl, optionally substituted by a hydroxy or $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl, $R^9$ to $R^{13}$ denote the same groups as $R^8$ as well as —O—$R^8$, m and n independently of one another denote 1, 2, 3 or 4, X denotes acids which are able to form adducts with triazine compounds (VII), and/or c) oligomeric esters of tris(hydroxyethyl) isocyanurate with aromatic polycarboxylic acids, benzoguanamine, tris(hydroxyethyl) isocyanurate, allantoin, glycouril, melamine, melamine cyanurate, dicyandiamide and/or guanidine; and/or d) nitrogen-containing phosphates of formulae $(NH_4)_yH_{3-y}PO_4$ and $(NH_4PO_3)_z$, wherein y is from 1 to 3 and z is from 1 to 10,000.

Component C is preferably zinc oxide, zinc hydroxide, zinc oxide hydrate, zinc borate, basic zinc silicate and/or zinc stannate.

Component C is particularly preferably zinc stannate.

The invention relates also to the use of a flame retardant formulation as claimed in one or more of the claims as a flame retardant, in particular as a flame retardant for clear coats and intumescent coatings, as a flame retardant for wood and other cellulose-containing products, as a reactive and/or non-reactive flame retardant for polymers, in the production of flame-retarded polymer molding compositions, in the production of flame-retarded polymer molded bodies and/or for providing polyester and cellulose pure and blended fabrics with flame retardant properties by impregnation.

The invention relates in particular to the use of the flame retardant formulations according to the invention as claimed in or for plug connectors, parts in power distributors that come into contact with current (RCD protection), printed circuit boards, casting compounds, power plugs, circuit breakers, lamp housings, LED lamp housings, capacitor housings, coil formers, fan assemblies, earth contacts, plugs, in/on printed circuit boards, housings for plugs, cables, flexible printed circuit boards, charging cables, motor covers, textile coatings and other products.

The invention also includes a flame-retarded thermoplastic or duroplastic polymer molding composition, polymer molded bodies, films, filaments and fibers comprising from 0.5 to 45% by weight flame retardant formulation as claimed, from 10 to 95% by weight thermoplastic or duroplastic polymer or mixtures thereof, from 0 to 55% by weight additives and from 0 to 55% by weight filler or reinforcing materials, wherein the sum of the components is 100% by weight.

The invention includes in particular a flame-retarded thermoplastic or duroplastic polymer molding composition, polymer molded bodies, films, filaments and fibers comprising from 5 to 30% by weight flame retardant formulation as claimed, from 20 to 95% by weight thermoplastic or duroplastic polymer or mixtures thereof, from 5 to 55% by weight additives and from 10 to 55% by weight filler or reinforcing materials, wherein the sum of the components is 100% by weight.

The flame-retarded thermoplastic or duroplastic polymer molding composition, polymer molded bodies, films, filaments and fibers are preferably polyesters, polyamides and/or polymer blends comprising polyamides or polyesters.

The preparation of phosphazenes is described in EP-A-0945478.

Particular preference is given to cyclic phenoxyphosphazenes of formula $$P_3N_3C_{36} \tag{V}$$

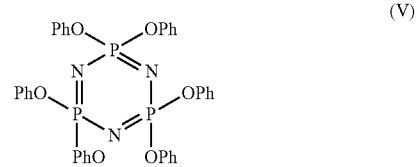 [SMILES: c1ccc(OP2(Oc3ccccc3)=NP(Oc3ccccc3)(Oc3ccccc3)=NP(Oc3ccccc3)(Oc3ccccc3)=N2)cc1]

(V)

or linear phenoxyphosphazenes according to formula (VI). The phenyl radicals can be optionally substituted.

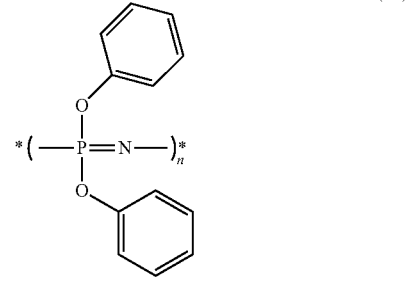

(VI)

Phosphazenes within the meaning of the present application are described in Mark, J. A., Allcock, H. R., West, R., "Inorganic Polymers", Prentice Hall International, 1992, pages 61-141.

The invention relates also to a plastics molding composition provided with flame-retardant properties, comprising an anticorrosive flame retardant formulation according to the invention, wherein the plastics material is thermoplastic polymers of the type HI (high impact) polystyrene, polyphenylene ethers, polyamides, polyesters, polycarbonates and blends or polymer blends of the type ABS (acrylonitrile-butadiene-styrene) or PC/ABS (polycarbonate/acrylonitrile-butadiene-styrene) or PPE/HIPS (polyphenylene ether/HI polystyrene) plastics materials.

Suitable phosphinates are described in PCT/WO97/39053, to which explicit reference is made.

M in formula (I) or (II) preferably denotes magnesium, calcium, aluminum or zinc, particularly preferably aluminum or zinc.

In the following, the expression "phosphinic acid salt" includes salts of phosphinic and diphosphinic acids and polymers thereof.

The phosphinic acid salts, which are prepared in aqueous medium, are substantially monomeric compounds. Depending on the reaction conditions, polymeric phosphinic acid salts can form under certain circumstances.

Suitable phosphinic acids as a constituent of the phosphinic acid salts are, for example:

dimethylphosphinic acid, ethyl-methylphosphinic acid, diethylphosphinic acid, methyl-n-propyl-phosphinic acid, methane-di(methylphosphinic acid), benzene-1,4-(dimethyl-phosphinic acid), methyl-phenyl-phosphinic acid, diphenylphosphinic acid.

The salts of the phosphinic acids according to the invention can be prepared by known methods, as are described in greater detail, for example, in EP-A-0699708. The phosphinic acids are thereby reacted, for example, in aqueous solution with metal carbonates, metal hydroxides or metal oxides.

The above-mentioned phosphinic acid salts can be used for the polyester compounds according to the invention in different physical forms depending on the type of polymer used and the desired properties. For example, in order to achieve better dispersion in the polymer, the phosphinic acid salts can be ground into a finely divided form. If desired, mixtures of different phosphinic acid salts can also be used.

The phosphinic acid salts according to the invention are thermally stable, do not decompose the polymers during processing, nor do they influence the production process of the plastics molding composition. The phosphinic acid salts are not volatile under the production and processing conditions conventional for polyesters.

The polymers preferably originate from the group of the thermoplastic polymers such as polyester, polystyrene or polyamide and/or from the group of the duroplastic polymers.

The duroplastic polymers are particularly preferably epoxy resins.

The duroplastic polymers are particularly preferably epoxy resins cured with phenols, dicyandiamide, phenol derivatives (resols), alcohols or amines, in particular phenol derivatives and dicyandiamide.

The duroplastic polymers are particularly preferably epoxy resins cured with phenols and/or dicyandiamide and or a catalyst.

The catalysts are preferably imidazole compounds.

The epoxy resins are preferably polyepoxy compounds.

The epoxy resins are preferably resins based on novolac.

The epoxy resins are preferably resins based on bisphenol A.

Polymers which can be used according to the invention are duroplastic and thermoplastic polymers.

The polymers are preferably polymers of mono- and di-olefins, for example polypropylene, polyisobutylene, polybutene-1, poly-4-methyl-pentene-1, polyisoprene or polybutadiene as well as polymers of cycloolefins such as, for example, of cyclopentene or norbornene; also polyethylene (which can optionally be crosslinked), for example high density polyethylene (HDPE), high density and high molecular weight polyethylene (HDPE-HMW), high density and ultra high molecular weight polyethylene (HDPE-UHMW), medium density polyethylene (MDPE), low density polyethylene (LDPE), linear low density polyethylene (LLDPE), branched low density polyethylene (VLDPE), and mixtures thereof.

The polymers are preferably copolymers of mono- and di-olefins with one another or with other vinyl monomers, such as, for example, ethylene-propylene copolymers, linear low density polyethylene (LLDPE) and mixtures thereof with low density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), as well as terpolymers of ethylene with propylene and a diene, such as hexadiene, dicyclopentadiene or ethylidenenorbornene; also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, and polyalkylene/carbon monoxide copolymers of alternating or random structure and mixtures thereof with other polymers, such as, for example, polyamides.

The polymers are preferably hydrocarbon resins (for example $C_5$-$C_9$), including hydrogenated modifications thereof (for example tackifier resins) and mixtures of polyalkylenes and starch.

The polymers are preferably polystyrene (polystyrene 143E (BASF), poly-(p-methylstyrene), poly-(alpha-methylstyrene).

The polymers are preferably copolymers of styrene or alpha-methylstyrene with dienes or acrylic derivatives, such as, for example, styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; mixtures of high impact strength of styrene copolymers and another polymer, such as, for example, a polyacrylate, a diene polymer or an ethylene-propylene-diene terpolymer; as well as block copolymers of styrene, such as, for example, styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, such as, for example, styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene, styrene, acrylonitrile and maleic anhydride or maleic acid imide on polybutadiene, styrene and maleic acid imide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof, as are known, for example, as so-called ABS, MBS, ASA or AES polymers.

The polymers are preferably halogen-containing polymers, such as, for example, polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and co-polymers, in particular polymers of halogen-containing vinyl compounds, such as, for example, polyvinyl chloride, polyvinylidene chloride, polyvinyl fluoride, polyvinylidene fluoride; as well as copolymers thereof, such as vinyl chloride-vinylidene chloride, vinyl chloride-vinyl acetate or vinylidene chloride-vinyl acetate.

The polymers are preferably polymers derived from alpha,beta-unsaturated acids and derivatives thereof, such as polyacrylates and polymethacrylates, polymethyl methacrylates, polyacrylamides and polyacrylonitriles impact modified with butyl acrylate and copolymers of the mentioned monomers with one another or with other unsaturated monomers, such as, for example, acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers derived from unsaturated alcohols and amines or their acyl derivatives or acetals, such as polyvinyl alcohol, polyvinyl acetate, stearate, benzoate, maleate, polyvinylbutyral, polyallyl phthalate, polyallylmelamine; as well as copolymers thereof with olefins.

The polymers are preferably homo- and co-polymers of cyclic ethers, such as polyalkylene glycols, polyethylene oxide, polypropylene oxide or copolymers thereof with bisglycidyl ethers.

The polymers are preferably polyacetals, such as polyoxymethylene, as well as polyoxymethylenes that comprise comonomers, such as, for example, ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes derived from polyethers, polyesters and polybutadienes having terminal hydroxyl groups, on the one hand, and aliphatic or aromatic polyisocyanates, on the other hand, as well as precursors thereof.

The polymers are preferably polyamides and copolyamides derived from diamines and dicarboxylic acids and/or from aminocarboxylic acids or the corresponding lactams, such as polyamide 2/12, polyamide 4 (poly-4-aminobutyric acid, Nylon® 4, DuPont), polyamide 4/6 (poly(tetramethylene adipamide), poly(tetramethylene-adipic acid diamide), Nylon® 4/6, DuPont), polyamide 6 (polycaprolactam, poly-6-aminohexanoic acid, Nylon® 6, DuPont, Akulon® K122, DSM; Zytel® 7301, DuPont; Durethan B 29, Bayer), polyamide 6/6 ((poly(N,N'-hexamethylene adipinediamide), Nylon® 6/6, DuPont, Zytel® 101, DuPont; Durethan® A30, Durethan® AKV, Durethan® AM, Bayer; Ultramid® A3, BASF), polyamide 6/9 (poly(hexamethylene nonanediamide), Nylon® 6/9, DuPont), polyamide 6/10 (poly(hexamethylene sebacamide), Nylon® 6/10, DuPont), polyamide 6/12 (poly(hexamethylene dodecanediamide), Nylon® 6/12, DuPont), polyamide 6/66 (poly(hexamethylene adipamide-co-caprolactam), Nylon® 6/66, DuPont), polyamide 7 (poly-7-aminoheptanoic acid, Nylon® 7, DuPont), polyamide 7,7 (polyheptamethylene pimelamide, Nylon® 7,7, DuPont), polyamide 8 (poly-8-aminooctanoic acid, Nylon® 8, DuPont), polyamide 8,8 (polyoctamethylene suberamide, Nylon® 8,8, DuPont), polyamide 9 (poly-9-aminononanoic acid, Nylon® 9, DuPont), polyamide 9,9 (polynonamethylene azelamide, Nylon® 9,9, DuPont), polyamide 10 (poly-10-amino-decanoic acid, Nylon® 10, DuPont), polyamide 10,9 (poly(decamethylene azelamide), Nylon® 10,9, DuPont), polyamide 10,10 (polydecamethylene sebacamide, Nylon® 10,10, DuPont), polyamide 11 (poly-11-aminoundecanoic acid, Nylon® 11, DuPont), polyamide 12 (polylauryllactam, Nylon® 12, DuPont, Grillamid® L20, Ems Chemie), aromatic polyamides starting from m-xylene, diamine and adipic acid; polyamides prepared from hexamethylenediamine and isophthalic acid and/or terephthalic acid (polyhexamethylene isophthalamide polyhexamethylene terephthalamide) and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also EPDM- or ABS-modified polyamides or copolyamides; and polyamides condensed during processing ("RIM polyamide systems").

The polymers are preferably polyureas, polyimides, polyamide-imides, polyetherimides, polyesterimides, polyhydantoins and polybenzimidazoles.

The polymers are preferably polyesters derived from dicarboxylic acids and dialcohols and/or from hydroxycarboxylic acids or the corresponding lactones, such as polyethylene terephthalate, polybutylene terephthalate (Celanex® 2500, Celanex® 2002, Celanese; Ultradur®, BASF), poly-1,4-dimethylolcyclohexane terephthalate, polyhydroxy benzoates, as well as block polyether esters derived from polyethers having terminal hydroxyl groups; also polyesters modified with polycarbonates or MBS.

The polymers are preferably polycarbonates and polyester carbonates.

The polymers are preferably polysulfones, polyether sulfones and polyether ketones.

The polymers are preferably crosslinked polymers derived from aldehydes, on the one hand, and phenols, urea or melamine, on the other hand, such as phenol-formaldehyde, urea-formaldehyde and melamine-formaldehyde resins.

The polymers are preferably drying and non-drying alkyd resins.

The polymers are preferably unsaturated polyester resins derived from copolyesters of saturated and unsaturated dicarboxylic acids with polyhydric alcohols, as well as vinyl compounds as crosslinkers, as well as halogen-containing, flame retardant modifications thereof.

The polymers are preferably crosslinkable acrylic resins derived from substituted acrylic acid esters, such as, for example, from epoxy acrylates, urethane acrylates or polyester acrylates.

The polymers are preferably alkyd resins, polyester resins and acrylate resins crosslinked with melamine resins, urea resins, isocyanates, isocyanurates, polyisocyanates or epoxy resins.

The polymers are preferably crosslinked epoxy resins derived from aliphatic, cycloaliphatic, heterocyclic or aromatic glycidyl compounds, for example products of bisphenol A diglycidyl ethers, bisphenol F diglycidyl ethers, which are crosslinked by means of conventional curing agents such as, for example, anhydrides or amines with or without accelerators.

The polymers are preferably mixtures (polyblends) of the above-mentioned polymers, such as, for example, PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate), POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high impact polystyrene), PPO/PA 6.6 (polyphenylene oxide/polyamide 6.6) and copolymers, PA/HDPE (polyamide/high density polyethylene), PA/PP (polyamide/polyethylene), PA/PPO (polyamide/polyphenylene oxide), PBT/PC/ABS (polybutylene terephthalate/polycarbonate/acrylonitrilebutadiene-styrene) and/or PBT/PET/PC (polybutylene terephthalate/polyethylene terephthalate/polycarbonate).

Additives such as, for example, antioxidants, UV absorbers and light stabilizers, metal deactivators, peroxide-destroying compounds, polyamide stabilizers, basic co-stabilizers, nucleating agents, fillers and reinforcing agents, further flame retardants as well as other additives, can be added to the combination according to the invention of components A and B and C as well as optionally D. Suitable antioxidants are, for example, alkylated monophenols, for example 2,6-di-tert-butyl-4-methylphenol; 1,2-alkylthiomethylphenols, for example 2,4-di-octylthiomethyl-6-tert-butylphenol; hydroquinones and alkylated hydroquinones, for example 2,6-di-tert-butyl-4-methoxyphenol; tocopherols, for example α-tocopherol, β-tocopherol, γ-tocopherol, δ-tocopherol and mixtures thereof (vitamin E); hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxyphenyl) disulfide; alkylidene bisphenols, for example 2,2'-methylene-bis(6-tert-butyl-4-methylphenol); O-, N- and S-benzyl compounds, for example 3,5,3',5'-tetra-tert-butyl-4,4'-dihydroxydibenzyl ether; hydroxybenzylated malonates, for example dioctadecyl 2,2-bis(3,5-di-tert-butyl-2-hydroxybenzyl)malonate; hydroxybenzyl aromatic compounds, for example 1,3,5-tris(3,5-di-tert-butyl)-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol; triazine compounds, for example 2,4-bis-octylmercapto-6(3,5-di-tert-butyl-4-hydroxyanilino)-1,3,5-triazine; benzyl phosphonates, for example dimethyl 2,5-di-tert-butyl-4-hydroxybenzylphosphonate; acylaminophenols, 4-hydroxylauric acid amide, 4-hydroxystearic acid anilide, N-(3,5-di-tert-butyl-4-hydroxyphenyl) carbamic acid octyl ester; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl)propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl) propionic acid, such as, for example, N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Suitable UV absorbers and light stabilizers are, for example, 2-(2'-hydroxy-phenyl)-benzotriazoles, such as, for example, 2-(2'-hydroxy-5'-methylphenyl)benzotriazole; 2-hydroxybenzophenones, such as, for example, the 4-hydroxy, 4-methoxy, 4-octoxy, 4-decyloxy, 4-dodecyloxy, 4-benzyloxy, 4,2',4-trihydroxy, 2'-hydroxy-4,4'-dimethoxy derivative; esters of optionally substituted benzoic acids, such as, for example, 4-tert-butyl-phenyl salicylate, phenyl salicylate, octylphenyl salicylate, dibenzoylresorcinol, bis(4-tert-butyl-benzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester; acrylates, such as, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

Furthermore, nickel compounds, such as, for example, nickel complexes of 2,2'-thio-bis-[4(1,1,3,3-tetramethylbutyl)phenol], such as the 1:1 or 1:2 complex, optionally with additional ligands, such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methyl-phenyl-undecylketoxime, nickel complexes of 1-phenyl-4-lauroyl-5-hydroxy-pyrazole, optionally with additional ligands; sterically hindered amines, such as, for example, bis(2,2,6,6-tetramethyl-piperidyl) sebacate; oxalic acid diamides, such as, for example, 4,4'-di-octyloxy-oxanilide; 2-(2-hydroxyphenyl)-1,3,5-triazines, such as, for example, 2,4,6-tris(2-hydroxy-4-octyloxyphenyl)-1,3,5-triazine.

Suitable metal deactivators are, for example, N,N'-diphenyloxalic acid diamide, N-salicylal-N'-salicyloylhydrazine, N,N'-bis(salicyloyl)-hydrazine, N,N'-bis(3,5-di-tert-butyl-4-hydroxyphenylpropionyl)-hydrazine, 3-salicyloylamino-1,2,4-triazole, bis(benzylidene)-oxalic acid dihydrazide, oxanilide, isophthalic acid dihydrazide, sebacic acid bisphenylhydrazide, N,N'-diacetyl-adipic acid dihydrazide, N,N'-bis-salicyloyl-oxalic acid dihydrazide, N,N'-bis-salicyloyl-thiopropionic acid dihydrazide.

Suitable peroxide-destroying compounds are, for example, esters of β-thio-dipropionic acid, for example the lauryl, stearyl, myristyl or tridecyl ester, mercaptobenzimidazole, the zinc salt of 2-mercaptobenzimidazole, zinc dibutyl-dithiocarbamate, dioctadecyl disulfide, pentaerythritol tetrakis-(β-dodecylmercapto)-propionate.

Suitable polyamide stabilizers are, for example, copper salts in combination with iodides and/or phosphorus compounds and salts of divalent manganese.

Suitable basic co-stabilizers are melamine, polyvinylpyrrolidone, dicyandiamide, triallyl cyanurate, urea derivatives, hydrazine derivatives, amines, polyamides, polyurethanes, alkali and alkaline earth salts of higher fatty acids, for example Ca stearate, Zn stearate, Mg behenate, Mg stearate, Na ricinoleate, K palmitate, antimony pyrocatechinate or tin pyrocatechinate.

Suitable nucleating agents are, for example, 4-tert-butyl-benzoic acid, adipic acid and diphenylacetic acid.

The fillers and reinforcing agents include, for example, calcium carbonate, silicates, glass fibers, asbestos, talc, kaolin, mica, barium sulfate, metal oxides and hydroxides, carbon black, graphite and others.

Suitable as further flame retardants are, for example, aryl phosphates, phosphonates, salts of hypophosphorous acid, as well as red phosphorus.

The other additives include, for example, plasticizers, exfoliated graphite, lubricants, emulsifiers, pigments, optical brighteners, flame retardants, antistatics and blowing agents.

These additional additives can be added to the polymers before, together with or after the addition of the flame retardants. The additives, as well as the flame retardants, can be metered in the form of a solid, in the form of a solution or melt as well as in the form of solid or liquid mixtures or in the form of masterbatches/concentrates.

Lubricants and/or demolding agents can additionally be used as additives. The lubricants and/or demolding agents are long-chained fatty acids, salts thereof, ester derivatives and/or amide derivatives thereof, montan waxes and/or low molecular weight polyethylene and/or polypropylene waxes.

The lubricants and/or demolding agents are preferably esters or salts of stearic acid, such as, for example, glycerol monostearate or calcium stearate.

The lubricants and/or demolding agents are preferably reaction products of montanic acids with ethylene glycol.

The reaction products are preferably a mixture of ethylene glycol monomontanic acid esters, ethylene glycol dimontanic acid esters, montanic acids and ethylene glycol.

The lubricants and/or demolding agents are preferably reaction products of montanic acids with a calcium salt.

The reaction products are particularly preferably a mixture of 1,3-butanediol monomontanic acid esters, 1,3-butanediol dimontanic acid esters, montanic acids, 1,3-butanediol, calcium montanate and the calcium salt.

The above-mentioned additives can be introduced into the plastics material in very different process steps. For example, in the case of polyamides it is possible to mix the additives into the polymer melt at the beginning or at the end of the polymerization/polycondensation or in a subsequent compounding process. Furthermore, there are processing methods in which the additives are not added until later. This is the case in particular with the use of pigment or additive masterbatches. Moreover, it is possible to mix pulverulent additives in particular with the polymer granules, which are optionally warm as a result of the drying process, using a drum mixer.

The polymer is particularly preferably one or more polyesters and/or polyamides, which can be provided with fillers and/or reinforcing materials.

The polyesters and polyamides are preferably in the form of molded bodies, films, filaments and/or fibers.

Surprisingly, it has been found that combinations according to the invention of salts of dialkylphosphinic acids and phosphazenes with zinc-containing additives exhibit a good flame retarding action, combined with improved stability during the processing of the molding compositions. This corrosion preventing effect has not been found to this extent in the prior art in any combination described hitherto.

The flame-resistant polyester compounds preferably further comprise carbodiimides.

The flame-resistant polyester compounds preferably comprise more than one thermoplastic polyester. The flame-resistant polyester compounds particularly preferably comprise PBT and PET in blends.

The flame-resistant polyester compounds preferably also comprise polycarbonates.

The invention relates also to a method for producing the flame-resistant polyester compounds or polyamide compounds according to the invention, wherein components A to D are mixed in the mentioned amounts by weight by melt extrusion.

Finally, the invention relates to the use of the fibers, films and molded bodies of the flame-resistant polyester compounds or polyamide compounds according to the invention in the home, in industry, in medicine, in motor vehicles, in aircraft, in ships, in spacecraft as well as in other means of transport, in office equipment as well as in objects and buildings which require increased fire protection.

The thermoplastic polyesters are selected from the group of the polyalkylene terephthalates. Polyalkylene terephthalates within the meaning of the invention are reaction products of aromatic dicarboxylic acids or reactive derivatives thereof (for example dimethyl esters or anhydrides) and aliphatic, cycloaliphatic or aralphatic diols, and mixtures of such reaction products.

Polyalkylene terephthalates which are preferably to be used according to the invention can be prepared by known methods from terephthalic acid (or reactive derivatives thereof) and aliphatic or cycloaliphatic diols having from 2 to 10 carbon atoms (Kunststoff-Handbuch, Vol. VIII, pages 695-710, Karl-Hanser-Verlag, Munich 1973).

Polyalkylene terephthalates which are preferably to be used according to the invention comprise at least 80 mol %, preferably 90 mol %, based on the dicarboxylic acid, of terephthalic acid radicals.

As well as comprising terephthalic acid radicals, the polyalkylene terephthalates which are preferably to be used according to the invention can comprise up to 20 mol % of radicals of other aromatic dicarboxylic acids having from 8 to 14 carbon atoms or radicals of aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic, adipic, sebacic acid, azelaic acid, cyclohexanediacetic acid, cyclohexanedicarboxylic acid.

The polyalkylene terephthalates to be used according to the invention can be branched by the incorporation of relatively small amounts of 3- or 4-hydric alcohols or 3- or 4-basic carboxylic acids, as are described, for example, in DE-A-19 00 270. Examples of preferred branching agents are trimesic acid, trimellitic acid, trimethylol-ethane and -propane and pentaerythritol.

Particular preference is given according to the invention to polyalkylene terephthalates which are prepared solely from terephthalic acid and reactive derivatives thereof (for example dialkyl esters thereof) and ethylene glycol and/or 1,3-propanediol and/or 1,4-butanediol (polyethylene and polytrimethylene and polybutylene terephthalate), and mixtures of these polyalkylene terephthalates.

Preferred polybutylene terephthalates comprise at least 80 mol %, preferably 90 mol %, based on the dicarboxylic acid, of terephthalic acid radicals and at least 80 mol %, preferably at least 90 mol %, based on the diol component, of 1,4-butanediol radicals.

The preferred polybutylene terephthalates can further comprise, in addition to 1,4-butanediol radicals, up to 20 mol % of other aliphatic diols having from 2 to 12 carbon atoms or cycloaliphatic diols having from 6 to 21 carbon atoms, for example radicals of ethylene glycol, 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3-pentanediol and -1,6,2-ethyl-1,3-hexanediol 2,2-diethyl-1,3-propanediol, 2,5-hexanediol, 1,4-di-([beta]-hydroxyethoxy)-benzene, 2,2-bis(4-hydroxycyclohexyl)-propane, 2,4-dihydroxy-1,1,3,3-tetramethyl-cyclobutane, 2,2-bis(3-[beta]-hydroxyethoxyphenyl)-propane and 2,2-bis(4-hydroxypropoxyphenyl)-propane (DE-A-24 07 674, DE-A-24 07 776, DE-A-27 15 932).

Polyalkylene terephthalates which are preferably to be used according to the invention are also copolyesters prepared from at least two of the above-mentioned acid components and/or from at least two of the above-mentioned alcohol components and/or 1,4-butanediol. Particularly preferred copolyesters are poly(ethylene glycol/1,4-butanediol) terephthalates.

There are suitable as component C (phosphazenes) the compounds described in Mark, J. A., Allcock, H. R., West, R., "Inorganic Polymers", Prentice Hall International, 1992, pages 61-141.

The phosphazenes can also be a crosslinked phosphazene, wherein at least one of the above phosphazenes (V) and (VI) is crosslinked with at least one crosslinking group. The crosslinking group consists of an o-phenylene group, an m-phenylene group, a p-phenylene group, a biphenyl group or a group represented by formula (XIII)

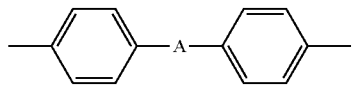 (XIII)

wherein

A denotes a group —SO$_2$, a group —S—, a group —O— or a group —C—(CH$_3$)$_2$—, wherein each of said crosslinking groups is arranged between the two oxygen atoms which are left behind after removal of the group R$^1$, wherein the number of R$^1$ groups in the crosslinked phosphazene is from 50 to 99.9%, based on the total number of R$^1$ groups in said phosphazene before crosslinking.

The above examples of halogen-free phosphazene can be used either on their own or in combination.

Specific examples of cyclic phosphazene and straight-chained phosphazene include a mixture of phosphazene compounds into which a phenoxy group and/or an alkoxy group has been introduced in a mixture of the cyclic and straight-chained chlorophosphazenes, for example hexachlorocyclotriphosphazenes, octachlorocyclotetraphosphazenes and the like. The chlorophosphazenes are prepared by reacting ammonium chloride and phosphorus pentachloride with one another at 120-130° C.

Specific examples of crosslinked phosphazene are phenoxyphosphazenes having a structure crosslinked by 4,4'-sulfonyldiphenylenes (bisphenol S radical); phenoxyphosphazenes having a structure crosslinked by a 2,2-(4,4'-diphenylene)-isopropylidene group; phenoxyphosphazenes having a structure crosslinked by a 4,4'-diphenylene group, and the like.

Specific examples of preferred phosphazenes are hexaphenoxycyclo-triphosphazenes, octaphenoxycyclotetraphosphazenes, cyclopentaphosphazenes and similar cyclophosphazenes substituted by phenoxy groups; and straight-chained phosphazenes substituted by phenoxy groups.

Reaction products with phosphoric acid or condensed phosphoric acids are understood as being compounds which are formed by reaction of melamine or the condensed melamine compounds, such as melam, melem or melon, etc., with phosphoric acid. Examples are dimelamine phosphate, dimelamine pyrophosphate, melamine phosphate, melamine pyrophosphate, melamine polyphosphate, melam polyphosphate, melon polyphosphate and melem polyphosphate, or mixed polysalts, as are described, for example, in WO-A-98/39306.

Component D is particularly preferably melamine polyphosphate or melamine cyanurate.

Particular preference is given according to the invention to the use of mineral particulate fillers based on talc, wollastonite, kaolin and/or glass fibers.

In particular for applications in which isotropy in dimensional stability and high thermal dimensional stability are required, such as, for example, in automotive applications for external bodywork parts, mineral fillers, in particular talc, wollastonite or kaolin, are preferably used.

Needle-shaped mineral fillers can particularly preferably also be used. Needle-shaped mineral fillers are understood according to the invention as being a mineral filler having a very pronounced needle-like character. Needle-shaped wollastonites may be mentioned as an example. Preferably, the mineral has a length-to-diameter ratio of from 2:1 to 35:1, particularly preferably from 3:1 to 19:1, most preferably from 4:1 to 12:1. The mean particle size of the needle-shaped fillers which are suitable according to the invention is preferably less than 20 microns, particularly preferably less than 15 microns, most particularly preferably less than 10 microns.

The filler and/or reinforcing material can optionally be surface-modified, for example with an adhesion promoter or adhesion promoter system, for example based on silane. However, pretreatment is not absolutely essential. In particular when glass fibers are used, polymer dispersions, film formers, branching agents and/or glass fiber processing aids can also be used in addition to silanes.

Particularly preferred reinforcing materials are glass fibers which generally have a fiber diameter between 7 and 18 microns, preferably between 9 and 15 microns, are added in the form of continuous fibers or chopped or ground glass fibers. The fibers can be provided with a suitable size system and an adhesion promoter or adhesion promoter system, for example based on silane.

Preferred adhesion promoters are silane compounds from the group aminopropyl-trimethoxysilane, aminobutyltrimethoxysilane, aminopropyltriethoxysilane, aminobutyltriethoxysilane, and the corresponding silanes containing a glycidyl group as substituent.

For treating the fillers, the silane compounds are generally used for surface coating in amounts of from 0.05 to 2% by weight, preferably from 0.25 to 1.5% by weight and in particular from 0.5 to 1% by weight, based on the mineral filler.

As a result of processing to the molding composition or molded body, the particulate fillers can have a smaller d97 or d50 value in the molding composition or molded body than the fillers originally used. As a result of processing to the molding composition or molded body, the glass fibers can have shorter length distributions in the molding composition or molded body than originally used.

In a further alternative preferred embodiment, the molding compositions can comprise, in addition to components A to D, at least one lubricant and demolding agent. There are suitable for this purpose, for example, long-chained fatty acids (for example stearic acid or behenic acid), salts thereof (for example Ca or Zn stearate) as well as ester derivatives or amide derivatives thereof (for example ethylene-bis-stearylamide), montan waxes (mixtures of straight-chained, saturated carboxylic acids having chain lengths of from 28 to 32 carbon atoms) as well as low molecular weight polyethylene or polypropylene waxes. According to the invention, preference is given to the use of lubricants and/or demolding agents from the group of the low molecular weight polyethylene waxes as well as the esters of saturated or unsaturated aliphatic carboxylic acids having from 8 to 40 carbon atoms with aliphatic saturated alcohols having from 2 to 40 carbon atoms, whereby pentaerythritol tetrastearate (PETS) is most particularly preferred.

In a further alternative preferred embodiment, the molding compositions can comprise further additives in addition to components A to D. Conventional additives are, for example, stabilizers (for example UV stabilizers, heat stabilizers, gamma ray stabilizers, hydrolytic stabilizers), antistatics, further flame retardants, emulsifiers, nucleating agents, plasticizers, processing aids, impact modifiers, dyes and pigments. The additives can be used on their own or in a mixture or in the form of masterbatches or can be added to the melt beforehand or applied to the surface thereof.

There can be used as stabilizers, for example, sterically hindered phenols and/or phosphites, hydroquinones, aromatic secondary amines such as diphenylamines, substituted resorcinols, salicylates, benzotriazoles and benzophenones, as well as differently substituted representatives of those groups and mixtures thereof. Suitable UV stabilizers which may be mentioned are various substituted resorcinols, salicylates, benzotriazoles and benzophenones.

Impact modifiers (elastomer modifiers, modifiers) are very generally copolymers which are preferably composed of at least two of the following monomers: ethylene, propylene, butadiene, isobutene, isoprene, chloroprene, vinyl acetate, styrene, acrylonitrile and acrylic or methacrylic acid esters having from 1 to 18 carbon atoms in the alcohol component.

There can be added as colorants inorganic pigments, such as titanium dioxide, ultramarine blue, iron oxide, zinc sulfide and carbon black, also organic pigments, such as phthalocyanines, quinacridones, perylenes, as well as dyes, such as nigrosin and anthraquinones, as well as other colorants. Within the scope of the present invention, the use of carbon black is preferred.

There can be used as nucleating agents, for example, sodium or calcium phenylphosphinate, aluminum oxide or silicon dioxide as well as, preferably, talc.

There can be used as processing aids, for example, copolymers of at least one [α]-olefin with at least one methacrylic acid ester or acrylic acid ester of an aliphatic alcohol. Preference is given to copolymers in which the [α]-olefin is composed of ethene and/or propene and the methacrylic acid ester or acrylic acid ester contains as the alcohol component linear or branched alkyl groups having from 4 to 20 carbon atoms. Acrylic acid butyl ester and acrylic acid (2-ethyl)hexyl ester are particularly preferred.

Examples of plasticizers which may be mentioned are phthalic acid dioctyl ester, phthalic acid dibenzyl ester, phthalic acid butylbenzyl ester, hydrocarbon oils and N-(n-butyl)benzenesulfonamide.

The flame-resistant polyester compounds according to the invention preferably further comprise carbodiimides.

Components A, B, C and D can be incorporated into thermoplastic polyesters by premixing all the constituents in the form of a powder and/or granules in a mixer and then homogenizing the mixture in the polymer melt in a compounding unit (for example a twin-screw extruder). The melt is conventionally removed in the form of a strand, cooled and granulated. Components C and D can also be introduced directly into the compounding unit separately via a metering system.

It is likewise possible to add the flame-retarding additives A, B, C and D to finished polymer granules or powder and process the mixture directly to molded parts in an injection molding machine.

In the case of polyesters, for example, the flame-retarding additives A, B, C and D can also be introduced into the polyester composition during the polycondensation.

The flame-resistant polyester compounds are suitable for the production of molded bodies, films, filaments and fibers, for example by injection molding, extrusion or pressing.

EXAMPLES

1. Components Used
Commercial polyesters (granules), component A:
Polybutylene terephthalate (PBT): Ultradur® 4500 (BASF, D)
Component B:
Aluminum salt of diethylphosphinic acid, referred to as Depal hereinbelow.

Component C:
Phosphazene SPB 100, Otsuka Chemical Co., Japan
Phosphazene Rabitle® FP 110, Fushimi Pharmaceuticals, Japan
Component D:
Melapur® MC (melamine cyanurate), Ciba Specialty Chemicals, CH
Melapur® 200/70 (melamine polyphosphate), Ciba Specialty Chemicals, CH
Delacal® M350 (melem), Delamin, UK
Component E: Flamtard® H, zinc stannate, William Blythe, UK
Component F: PPG glass fibers HP 3786 EC 10 4, 5 MM
Component G: Lubricant: Licowax® E, montan wax, Clariant, CH 2. Production, Processing and Testing of Flame-Resistant Polyester Compounds The flame retardant components were mixed in the ratio indicated in the tables with the polymer granules and optionally additives and incorporated at temperatures of from 240 to 280° C. in a twin-screw extruder (Leistritz ZSE 27 HP-44D). The homogenized polymer strand was removed, cooled in a water bath and then granulated.

After the molding compositions had dried sufficiently, they were processed to test specimens at melt temperatures of from 260 to 280° C. on an injection molding machine (Arburg 320C/KT). The flame resistance of the molding compositions was determined by the UL94 V method (Underwriters Laboratories Inc. Standard of Safety, "Test for Flammability of Plastic Materials for Parts in Devices and Appliances", pages 14 to 18, Northbrook 1998).

The flammability of the test specimens was assessed by determining the oxygen index (LOI in accordance with ASTM D 2863-77).

The corrosion was studied by means of the platelet method. The platelet method devised by the DKI (Deutsches Kunststoffinstitut, Darmstadt) is used in modeling tests for the comparative evaluation of metallic materials or of the corrosion and wear intensity of plasticizing molding compositions. In this test, two test specimens are arranged in the die in a pair, so that they form a rectangular gap having a length of 12 mm, a width of 10 mm and an adjustable height of from 0.1 to a maximum of 1 mm for the passage of the molten plastics material. Molten plastics material from a plasticizing unit is extruded (or injected) through the gap, whereby high local shear stresses and shear speeds occur in the gap (Günther Menning, Markus Lake "Verschleißminderung in der Kunststoffverarbeitung—Phänomene und Schutzmaßnahmen" 2nd Edition Carl Hanser Verlag, Munich 2008, pages 281-284; Eggering, P et al.: "Verschleiß an Metalloberflächen, die mit schnell strömenden Kunststoffschmelzen in Berihrüng stehen" Kunststofftechnik 10 (1971) 5, pages 159-168).

A wear parameter is the weight loss of the test specimen, which is determined by difference weighing of the test specimens using an A&D electronic balance with a variation of 0.1 mg. The mass of the test specimens was determined before and after the corrosion test with a polymer throughput of 25 or 10 kg.

After a previously defined throughput (25 or 10 kg), the test platelets are removed and the plastics material adhering thereto is cleaned off by physical/chemical methods. Physical cleaning is carried out by removing the hot plastics composition by rubbing with a soft material (cotton). Chemical cleaning is carried out by heating the test specimens for 10 minutes at 60° C. in m-cresol. After boiling, any plastics composition still adhering to the plates is removed by rubbing with a soft cotton pad.

The glow wire resistance was determined by means of the glow wire test GWIT (glow wire ignition temperature) according to IEC 60695-2-13. In the GWIT test, the glow wire ignition temperature that is 25K (30K between 900° C. and 960° C.) higher than the maximum glow wire temperature that does not result in ignition, even during the period of contact with the glow wire, in 3 successive tests is indicated for 3 test specimens (for example plates measuring 60×60×1.5 mm) with the aid of a glowing wire at temperatures between 550 and 960° C. Ignition here means a flame with a burning time >=(greater than/equal to) 5 seconds.

In order to evaluate the copper corrosion, UL 94 test specimens were tightly wound with a copper foil (0.1-0.2 mm) and stored for 72 hours in demineralized water at 120° C. If neither the test specimen nor the copper foil exhibits a change after storage, the flame retardant formulation does not cause copper corrosion.

TABLE 1

Comparative examples: PBT GF 30 with combination of Depal with melamine polyphosphate and phosphazene

| | Example | | | |
|---|---|---|---|---|
| | C1 | C2 | C3 | C4 |
| PBT (wt. %) | 49.7 | 49.7 | 49.7 | 49.7 |
| Glass fibers (wt. %) | 30 | 30 | 30 | 30 |
| Depal (wt. %) | 13.3 | 13.3 | 12 | 18 |
| Phosphazene SPB 100 (wt. %) | | 2.7 | | |
| Melamine polyphosphate (wt. %) | 6.7 | 3.3 | 6 | |
| Lubricant (wt. %) | 0.3 | 0.3 | 0.3 | 0.3 |
| Corrosion | significant | slight | significant | slight |
| UL94 (0.8 mm) | V0 | V0 | V0 | V1 |
| UL94 (0.8 mm) after oven storage | V0 | V0 | V0 | V1 |
| GWIT (1 mm) (° C.) | 750 | 775 | 750 | 750 |
| LOI (% $O_2$) | 35.4 | 41.1 | 40.0 | 42.0 |
| CTI (V) | 575 | 550 | 575 | 575 |
| Elongation at tear (%) | 1.9 | 2.5 | 2.0 | 1.8 |
| Impact strength at room temperature (20° C.) (kJ/m$^2$) | 37 | 51 | 50 | 38 |
| Notched impact strength at room temperature (20° C.) (kJ/m$^2$) | 6.2 | 6.4 | 6.9 | 5.0 |
| Copper corrosion | greenish coating | greenish coating | greenish coating | greenish coating |

TABLE 2

Comparative examples and combination according to the invention of Depal with phosphazene, melamine polyphosphate and zinc stannate

| | Example | | | |
|---|---|---|---|---|
| | C5 | C6 | E1 | E2 |
| PBT (wt. %) | 49.2 | 48.7 | 49.7 | 49.7 |
| Glass fibers (wt. %) | 30 | 30 | 30 | 30 |
| Depal (wt. %) | 13.3 | 13.3 | 11.7 | 11.3 |
| Phosphazene SPB 100 (wt. %) | | | 2.6 | 2.6 |
| Melamine polyphosphate (wt. %) | 6.7 | 6.7 | 3.2 | 3.1 |
| Zinc stannate (wt. %) | 0.5 | 1.0 | 0.5 | 1.0 |
| Lubricant (wt. %) | 0.3 | 0.3 | 0.3 | 0.3 |
| Corrosion | slight | slight | zero | zero |
| UL94 (0.8 mm) | V0 | V0 | V0 | V0 |
| UL94 (0.8 mm) after oven storage | V0 | V0 | V0 | V0 |
| GWIT (1 mm) (° C.) | 750 | 750 | 775 | 775 |

TABLE 2-continued

Comparative examples and combination according to the invention of Depal with phosphazene, melamine polyphosphate and zinc stannate

| | Example | | | |
|---|---|---|---|---|
| | C5 | C6 | E1 | E2 |
| LOI (% $O_2$) | n.d. | n.d. | 46.6 | 42.0 |
| CTI (V) | 550 | 550 | 600 | 600 |
| Elongation at tear (%) | 1.8 | 1.9 | 2.6 | 2.4 |
| Copper corrosion | greenish coating | greenish coating | no change | no change |

It is clear from comparative examples C1 to C6 that it is not possible using Depal, phosphazene or melamine polyphosphate on their own or by means of the combination of Depal with melamine polyphosphate or the combination of phosphazene with melamine polyphosphate simultaneously to achieve UL 94 V-0, GWIT 775° C., an elongation at tear greater than 2% and wear which is not measurable.

By means of the combination according to the invention of Depal with phosphazene, with melamine phosphate and zinc stannate, an elongation at tear of more than 2%, a clear UL 94 V-0 classification and a GWIT of 775° C. are achieved in PBT. No wear could be detected on processing. The compounds did not exhibit copper corrosion.

The flame-resistant polyester compounds according to the invention are additionally distinguished by a high oxygen index and a high tracking index.

The flame-retarding polyamide composition preferably has a tracking index (CTI), measured in accordance with the International Electrotechnical Commission Standard IEC-60112/3, of greater than/equal to 600 volts.

The invention claimed is:

1. A thermoplastic polyester or polyamide formulation comprising an anticorrosive flame retardant formulation, comprising as component A from 50 to 82% by weight of a phosphinic acid salt of formula (I)

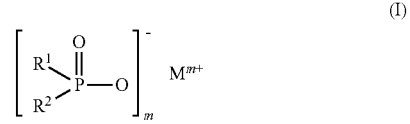

wherein
$R^2$ are the same or different and are methyl, ethyl, n-propyl, isopropyl, n-butyl, tert-butyl, n-pentyl or phenyl;
M is Mg, Ca, Al, Ti, Zn, Na, K or a combination thereof;
m is from 1 to 4;
and
as component B from 10 to 30% by weight of a phenoxyphosphazene selected from the group of compounds of formula (V) and formula (VI)

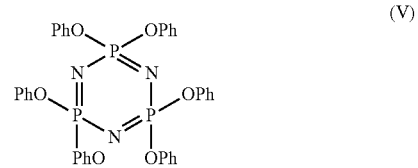

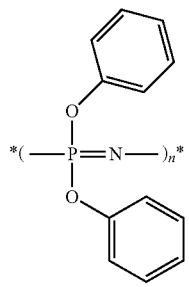

(VI)

where n is from 1 to 4;
as component C from 2 to 19% by weight of zinc stannate, and
as component D from 1 to 30% by weight of a nitrogen-containing flame retardant selected from the group consisting of:
a) melamine phosphate, dimelamine phosphate, melamine pyrophosphate, melamine polyphosphates, melam polyphosphates, melem polyphosphates, melon polyphosphates, melamine condensation products and mixtures thereof,
c) melamine, melamine cyanurate, dicyandiamide, guanidine and mixtures thereof;
d) nitrogen-containing phosphates of formulae $(NH_4)_y H_{3-y}PO_4$ and $(NH_4PO_3)_z$,
wherein y is from 1 to 3 and z is from 1 to 10,000 and mixtures thereof,
or a combination of any of a), c) and d),
wherein the sum of the components A, B, C and D is 100% by weight.

2. The thermoplastic polyester or polyamide formulation comprising the anticorrosive flame retardant formulation as claimed in claim 1, comprising
from 60 to 86% by weight component A,
from 10 to 20% by weight component B,
from 2 to 18% by weight component C and
from 2 to 20% by weight component D,
wherein the sum of the components by weight is 100% by weight.

3. A flame retardant comprising the thermoplastic polyester or polyamide formulation as claimed in claim 1.

4. A flame-retarded thermoplastic molding composition present in a polymer molded body, film, filament or fiber comprising
from 0.5 to 45% by weight of the anticorrosive flame retardant formulation as claimed in claim 1,
from 10 to 95% by weight of thermoplastic,
from 0 to 55% by weight of additives and from 0 to 55% by weight of filler or reinforcing materials,
wherein the sum of the components is 100% by weight.

5. A flame-retarded thermoplastic present in a molded body, film, filament or fiber, comprising
from 5 to 30% by weight of the anticorrosive flame retardant formulation as claimed in claim 1,
from 20 to 95% by weight of thermoplastic,
from 5 to 55% by weight of additives and from 10 to 55% by of weight filler or reinforcing materials,
wherein the sum of the components is 100% by weight.

6. The flame-retarded thermoplastic molding composition as claimed in claim 4, wherein the flame-retarded thermoplastic molding composition is a polyester, a polyamide or a polymer blend comprising polyamides or polyesters.

7. The flame retardant as claimed in claim 3, wherein the flame retardant is present in clear coats or intumescent coatings, wood or other cellulose-containing products, flame-retarded polymer molding compositions, and pure and blended polyester and cellulose fabrics with flame retardant properties.

8. An article comprising the flame retardant as claimed in claim 3 selected from the group consisting of: a plug connector, a power distributor that comes into contact with current, a printed circuit board, a casting compound, a power plug, a circuit breaker, a lamp housing, a LED lamp housing, a capacitor housing, a coil former, a fan assembly, an earth contact, a plug, a printed circuit board, a housing for plugs, a cable, a flexible printed circuit board, a charging cable, a motor cover and a textile coating.

* * * * *